(12) United States Patent
Al-Khaja

(10) Patent No.: US 8,582,731 B2
(45) Date of Patent: Nov. 12, 2013

(54) METHOD FOR RECORDING TELEPHONE CONVERSATIONS

(76) Inventor: Ali Hassan Al-Khaja, Manama (BH)

( * ) Notice: Subject to any disclaimer, the term of this patent is extended or adjusted under 35 U.S.C. 154(b) by 75 days.

(21) Appl. No.: 13/307,056

(22) Filed: Nov. 30, 2011

(65) Prior Publication Data

US 2013/0114803 A1    May 9, 2013

Related U.S. Application Data

(60) Provisional application No. 61/557,432, filed on Nov. 9, 2011.

(51) Int. Cl.
*H04M 1/64* (2006.01)
(52) U.S. Cl.
USPC .................................. 379/88.25; 379/204.01
(58) Field of Classification Search
USPC ............... 379/67.1–88.28, 265.01–266.1; 455/413
See application file for complete search history.

(56) References Cited

U.S. PATENT DOCUMENTS

| | | | | |
|---|---|---|---|---|
| 6,263,049 B1* | 7/2001 | Kuhn | ......................... | 379/32.01 |
| 6,784,899 B1* | 8/2004 | Barrus et al. | .................. | 715/717 |
| 6,853,714 B2* | 2/2005 | Liljestrand et al. | ....... | 379/201.03 |
| 6,987,841 B1* | 1/2006 | Byers et al. | ................ | 379/88.17 |
| 7,013,155 B1* | 3/2006 | Ruf et al. | ....................... | 455/466 |
| 7,042,987 B2* | 5/2006 | Schwartz et al. | ............... | 379/68 |
| 7,548,609 B2* | 6/2009 | Rao et al. | ......................... | 379/68 |
| 7,599,355 B2* | 10/2009 | Sunstrum | ....................... | 370/352 |
| 7,715,351 B2* | 5/2010 | Karaoguz et al. | ............. | 370/338 |
| 7,813,481 B1* | 10/2010 | Hursey et al. | .................... | 379/68 |
| 7,840,681 B2* | 11/2010 | Acharya et al. | ............... | 709/227 |
| 8,428,559 B2* | 4/2013 | Silva | ............................ | 455/412.1 |
| 2002/0118798 A1* | 8/2002 | Langhart et al. | ............. | 379/67.1 |
| 2005/0220288 A1* | 10/2005 | Huey | ........................ | 379/265.02 |
| 2005/0226395 A1* | 10/2005 | Benco et al. | ..................... | 379/85 |
| 2006/0014559 A1* | 1/2006 | Raman | ........................ | 455/550.1 |

* cited by examiner

*Primary Examiner* — Simon Sing
(74) *Attorney, Agent, or Firm* — Karl F. Milde, Jr.; Eckert Seamans Cherin & Mellott, LLC

(57) ABSTRACT

In a method for recording telephone conversations between a subscriber to a service provider and a telephone conversation partner, the subscriber dials the number of the service provider and interacts with a menu-driven IVR user interface, entering his subscriber number as well as a corresponding PIN-number to authenticate himself. After the verification, the subscriber can chose one or more of the following options: (a) listen to one or more of his previously recorded telephone conversations, (b) delete one or more of his previously recorded telephone conversations, (c) arrange that all incoming and outgoing calls are to be automatically recorded, (d) deactivate the setting that all incoming and outgoing calls are automatically recorded, and/or (e) record the next telephone conversation. At the beginning of each conversation to be recorded, the service provider informs the telephone conversation partner, via a warning voice message, that the telephone conversation will be recorded.

28 Claims, 4 Drawing Sheets

METHOD FOR RECORDING TELEPHONE CONVERSATIONS

CROSS REFERENCE TO RELATED APPLICATION

This present application claims benefit of priority from U.S. Provisional Application Ser. No. 61/557,432, filed Nov. 9, 2011, entitled "METHOD FOR RECORDING TELEPHONE CONVERSATIONS".

BACKGROUND OF THE INVENTION

The present invention relates to a method for recording telephone conversations. More specifically, the invention relates to a method for recording telephone conversations with a telephone conversation partner, wherein a warning voice message indicating the recording is played in order to inform the telephone conversation partner.

Methods for recording telephone conversations are well known in the prior art. These methods are directed to the recording of conversations by companies in order to improve customer services, employees' productivity and also in order to perform remote supervision. The customers are informed by means of a voice message indicating the recording.

In addition, telephone conversation recording performed by companies is a very helpful tool for dispute resolution, sales verification as well as training and development of employees.

Ancillary result of recording telephone conversations is that the customers calling these companies, once they know that a call is being recorded, are more polite and more patient which helps to avoid disputes.

From the customer's point of view the telephone conversation recording performed by companies is a one-way driven service and concept. Customers are, for example, not always sure if the conversation has been recorded. In addition it is difficult to obtain a copy of the recorded telephone conversation in case it is needed, for example, as a support for a complaint, a legal action or an insurance claim.

SUMMARY OF THE INVENTION

A principal objective of the present invention is to provide a method for recording a user's telephone conversations which enables everybody to participate, as an individual or as a business, in order to experience a better service by the telephone conversation partner and also in order to facilitate the availability of the recorded conversation. The method according to the invention can help to improve the quality of services offered by a telephone conversation partner, since a warning voice message indicating the recording is played in order to inform the telephone conversation partner accordingly.

A further objective of the present invention is to provide a method for recording telephone conversations which is very easy to implement without a need for additional hardware and which offers a high level of security.

These objectives, as well as further objectives which will become apparent from the discussion that follows, are achieved, according to the present invention, by providing a method for recording telephone conversations on a subscriber basis, whereby the subscription can be performed online over the webpage of the service provider or by calling a corresponding number of the so-called "service provider". The payment can be preferably performed by entering the credit card details. The subscriber isn't limited to a natural person and can, for example, be a company.

Within the framework of the invention, a subscriber first dials the number of the service provider and interacts with a menu-driven IVR user interface (wherein "IVR" means "interactive voice response"). During the interaction with the IVR interface, the subscriber enters his subscriber number and or a corresponding PIN-number to authenticate himself. After the verification of the data entered, the subscriber can select from an options menu: to listen to one or more of his previously recorded telephone conversations; to delete one or more of his previously recorded telephone conversations; to arrange that either all incoming and outgoing calls are automatically recorded; and/or to record the next telephone conversation. The service provider can be a specialized company offering the call recording service or a phone company that offers full telecommunications service to its subscribers.

According to a particular feature of the invention, the subscriber may be recognized and authenticated by means of his phone number.

According to the invention, at the beginning of each conversation to be recorded the telephone conversation partner is informed via a warning voice message that the telephone conversation will be recorded. In case the call receiver does not agree with the recording, he can hang up at any time. According to an optional feature, in case the conversation partner doesn't agree with the recording, he can press a button on his phone, e.g. the number "3", wherein according to the settings entered by the subscriber the conversation can either be continued without recording, or it can be terminated.

In case the subscriber wants to record the next outgoing telephone conversation, he gives the corresponding IVR instruction followed by the number to be dialed, and the number to be dialed is subsequently dialed by the service provider system. According to one variant of this method, the recording and optionally the warning voice message start immediately. The immediate start of the recording can be very helpful in order to prove that the waiting time is too long or that, e.g., the call receiver is repeatedly or continuously unavailable. Preferably, the warning voice message is played automatically when the conversation partner picks up the phone.

Alternatively, after entering the corresponding IVR instruction followed by the number to be dialed, the number to be dialed is subsequently dialed by the service provider system and the subscriber can start the recording any time manually by pressing a button on his phone, e.g., the * button. When the conversation partner picks up the phone, or at anytime thereafter, the subscriber can start the warning voice message by pressing another button on his phone.

According to a variant of the method according to the invention, the subscriber can first dial the number of the service provider and, after authentication, establish a teleconference call with one or more conversation partners (conferees), whereby the playing of the warning voice message and the recording can start either immediately or after the subscriber presses a button, e.g., the "#" button, on his telephone instrument. Alternatively subscriber first dials the number of one or more conversation partners and then establishes a teleconference call with the service provider, including authentication, whereby the playing of the warning voice message and the recording can start either immediately or after the subscriber presses a button, e.g., the "#" button, on his telephone.

In case the service provider is the telecommunication provider of the subscriber, then the recording including the playing of the warning voice message are initiated without the need for a teleconference but by simply pressing a button, e.g., "#", on the subscriber's phone.

In case the subscriber receives a telephone call and the setting that all incoming and outgoing calls are automatically recorded is deactivated, he can dial the number of the service provider within the framework of a teleconference with the caller and the service provider, performing the authentication while the caller is on hold, and then choosing the option to record the incoming call. Subsequently, the calling party is informed by means of a warning voice message that the conversation will be recorded and recording starts. If the service provider is the telecommunication provider of the subscriber, then the recording including the playing of the warning voice message are initiated without the need for a teleconference but by simply pressing a button, e.g., "#", on the subscriber's telephone.

In accordance with another variant of the invention, the subscriber can call the number of his service provider and within the framework of the interaction with the IVR system can arrange that all incoming and outgoing calls are automatically recorded, as already explained.

In case of an incoming call, the warning voice message is played after the caller has dialed the subscriber's number or when the subscriber picks up the phone and the recording starts. For this purpose a teleconference with the service provider is immediately established. In case of an outgoing call a teleconference with the service provider is immediately established as soon as the subscriber picks up the phone in order to dial a number. The playing of the warning voice message and the recording start as soon as the conversation partner picks up the phone. The subscriber has the option to deactivate the recording any time by pressing a button or a button combination on his telephone, e.g., "*#".

In case the service provider is the telecommunication provider of the telephone subscriber then the automatic recording including the playing of the warning voice message are initiated without the need for a prior teleconference.

In case the subscriber's phone is a smart phone, the establishing of the teleconference for incoming or outgoing calls can be preferably done by means of a dedicated software (app).

According to another aspect of the invention, the settings for the manually initiated recording or the automatic recording of all incoming and outgoing calls can be entered via internet after authentication by means of a user subscriber number and a corresponding PIN.

In addition beep sounds reminding that the call is recorded and/or the warning voice message can be repeated in defined time intervals during the call.

According to the invention, the recorded telephone conversations are stored on the computer system of the service provider and can be deleted or downloaded on demand or listened to online by the subscriber. Of course, a subscriber has access only to his own telephone conversations either as a caller or as a call receiver. In order to use the web based services the subscriber has to authenticate himself by means of the subscriber number and the corresponding PIN-number or a password.

The dialing of the numbers referred to within the framework of the invention can be done (1) by means of a landline phone, (2) by means of a mobile phone, or (3) by means of an internet based phone device which can be, e.g., the keyboard of a computer.

According to a variant of the present invention, another possibility is that the service provider automatically sends an e-mail or an MMS (Multimedia Messaging Service) containing the voice file of the recorded telephone conversation to the desired e-mail address or phone number of the subscriber. Each recorded telephone conversation is assigned a unique number which can also be stated in the warning voice message addressed to the telephone conversation partner.

The inventive method optionally offers the possibility that the telephone conversation partner of a subscriber can enter an e-mail address to which the recorded conversation is to be sent after the end of the call. This can be done after the warning voice message, informing that the call will be recorded, by pressing a telephone key and subsequently entering the desired e-mail address via IVR interaction.

According to another embodiment of the invention, the subscriber's conversation partner can receive a temporary password or PIN as well as the unique number of the conversation by means of the IVR System at the beginning of the conversation in order to access the recorded conversation online.

Alternatively in case subscriber's conversation partner uses a mobile phone for the conversation, the temporary password as well as the unique number of the conversation are sent automatically on his mobile phone after the end of the call or after pressing a button or a button combination on his phone, e.g., "##", after being advised by the IVR.

According to the invention, the subscriber can optionally use his own, personalized warning voice message informing the telephone conversation partner that the call will be recorded. For example, he can record the desired voice message and upload it by means of IVR or an Internet connection on the computer system of the service provider by authenticating himself via the subscriber number and the corresponding PIN.

In addition, the inventive method offers the option to allow to the subscriber to record himself, to allow recording of important numbers, addresses, or dictations after the end of a telephone call. This option can be activated by pressing a button on the telephone, for example the hash-key before hanging up. After the recording of important numbers, addresses, or dictations the subscriber can simply hang up. Of course subscriber can record himself, important numbers, addresses, or dictations anytime by calling the service provider and choose a self-recording option by entering, e.g., "#**".

According to another variant the invention, the conversation partner of the subscriber must confirm that he agrees with the recording by pressing a button, e.g., "2", on his phone or by means of interacting with the IVR-System, e.g. by saying "I agree". If the button is not pressed, the call will be interrupted and the conversation partner will be informed accordingly. In case the conversation partner doesn't agree with the recording, he can press a button on his phone, e.g. "3", or interact with the IVR System, e.g. by saying "I disagree", wherein according to the settings entered by the subscriber the conversation can be continued without recording or the conversation terminated.

Within the framework of another embodiment of the invention, already existing call recording systems and methods known from the prior art, especially systems and methods directed to the recording of conversations by companies in order to improve customer services, to improve employees' productivity and also in order to perform remote supervision, can be modified in order to allow for any caller or called person to receive a copy of the recording. This can be done automatically, or by interacting with an IVR. A copy of the recorded conversation may be provided to the caller or to the called person as a sound file, via MMS or email or as a link with a password via SMS (Short Message Service) or email, after the call ends simply by pressing a button on the phone of the caller or of the called person, e.g., the number sign "#", and by entering a mobile number or an email address when advised by a voice message issued by the IVR (e.g., "If you wish to receive a copy of this recorded message please enter "#" and then enter your mobile number or your email address."). Alternatively, in case the number of the caller or called person is known and/or is recognized by the system, this number is automatically used by the system and the copy of the recorded conversation may be provided to the caller or to the called person as a link with a password via SMS or as an MMS containing the recorded message to this number. In this case, the caller or the called person receives a corresponding voice message after pressing the corresponding button, e.g., "#", as described above (e.g., "An SMS containing a link with a password will be sent to your phone number used for this call."). The caller can, for example, obtain the sound file by visiting the link and entering the password sent to him.

The system will send the recorded massage or a link with a password immediately after the call ends. Optionally additional information can be sent, such as the name or staff number of the employee who attended the call, etc.

This variant has the advantage that no subscription is needed. In addition, already existing call recording systems can be adapted without great effort and expense.

According to another variant of the invention the method disclosed is not limited to subscribers. For non-subscribers, the billing can be implemented as follows:

A non-subscriber dials a telephone number of the service provider which is a premium rate number. This applies to connecting to a targeted number through the service provider or within the framework of a conference call as described above for the options available to a subscriber. In this case, the non-subscriber first dials the number of the conversation partner and then establishes a teleconference call with the service provider by using the premium rate number, whereby the playing of the warning voice message and the recording start either immediately or after the non-subscriber presses a button on his telephone. The non-subscriber receives the recorded conversation as a sound file via MMS or email or as a link with a password via SMS or email after the call ends simply by pressing a button on the phone of the caller or of the called person, e.g., "#", and by entering a mobile number or an email address when advised by a voice message issued by the IVR (e.g., "To receive a copy of this recorded message please enter '#' and then enter your mobile number or your email address.").

Alternatively in case the number of the non-subscriber is recognized by the service provider, this number is automatically used by the system and the copy of the recorded conversation may be provided to the non-subscriber as a link with a password via SMS or as an MMS containing the recorded message to this number. In this case the non-subscriber receives a corresponding voice message after pressing the corresponding button, e,g, "#", as described above (e.g., "An SMS containing a link with a password will be sent to your phone number used for this call."). The non-subscriber can, for example, obtain the sound file by visiting the link and entering the password sent to him.

In case the non-subscriber receives a telephone call he can dial the premium rate number of the service provider within the framework of a teleconference with the caller and the service provider. Subsequently, the calling party is informed by means of a warning voice message that the conversation will be recorded and recording will start either immediately or after the non-subscriber presses a button on his telephone.

The method optionally offers the possibility that the telephone conversation partner of the non-subscriber can also receive a copy of the recorded conversation after the call has ended, in the same manner as for a subscriber as described above in case of subscribers.

The billing can also be done by a premium SMS sent by the non-subscriber to the service provider in order to activate the recording for the next call made by means of his mobile phone number.

For a full understanding of the present invention, reference should now be made to the following detailed description of the preferred embodiments of the invention as illustrated in the accompanying drawings.

DESCRIPTION OF THE PREFERRED EMBODIMENTS

Figure 1A:
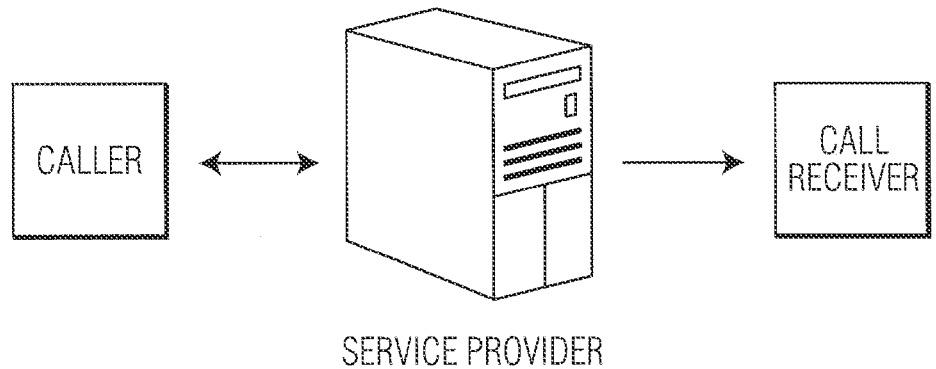
FIG. 1 shows a schematic view of a first variant of the inventive method.

The preferred embodiments of the present invention will now be described with reference to FIGS. 1-4 of the drawings. Identical elements in the various figures are designated with the same reference numerals.

Figure 1B:
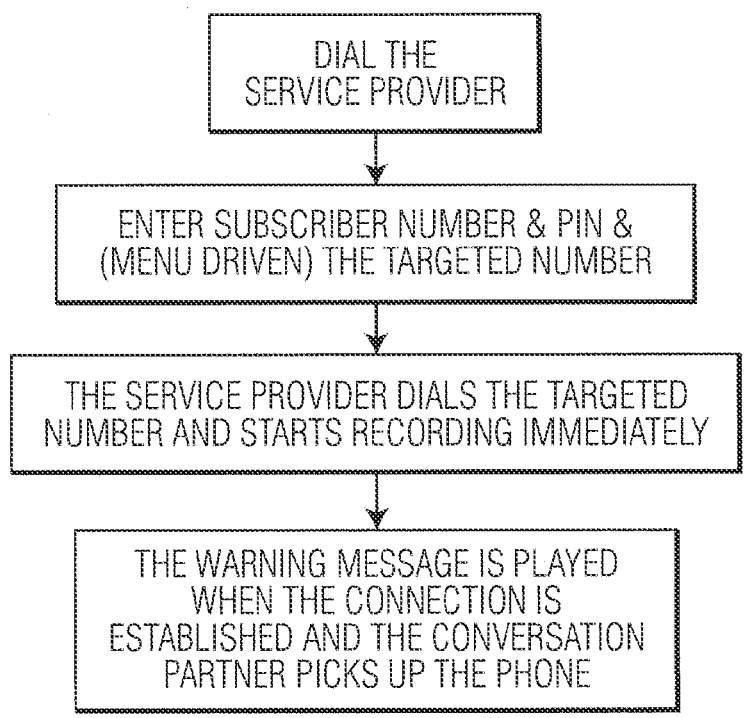

FIG. 1 illustrates a variant of the invention, according to which a subscriber first dials a number of a service provider where he interacts with a menu-driven IVR user interface (step 1). During the interaction with the IVR interface, the subscriber enters his subscriber number and or a corresponding PIN-number to authenticate himself. After the verification of the data entered, the subscriber can choose to record the next telephone conversation. For this purpose he gives the corresponding IVR instruction followed by the number to be dialed (step 2) and the number to be dialed is subsequently dialed by the service provider and the recording starts immediately (step 3). In a next step (step 4) the warning message is played when the connection is established and the conversation partner picks up the phone.

According to the invention at the beginning of each conversation to be recorded the telephone conversation partner is informed via a warning voice message that the telephone conversation will be recorded. The warning voice massage can be, e.g., as follows: "This call is being recorded by for service quality assurance purposes and for future reference."

Figure 2A:
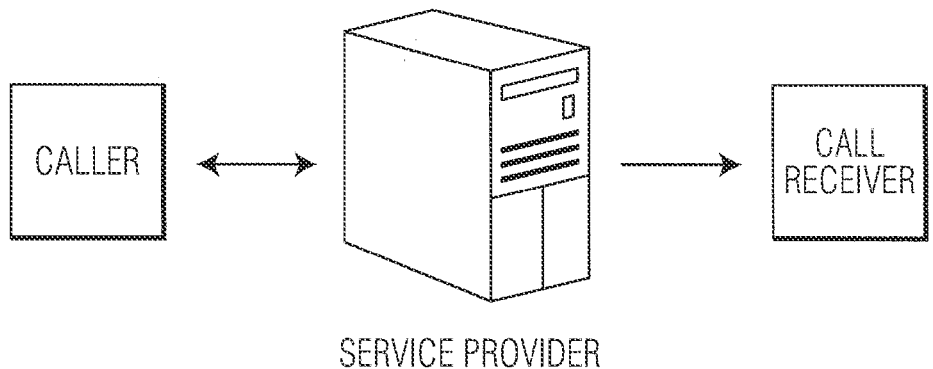
FIG. 2 shows a schematic view of a second variant of the inventive method.
Figure 2B:
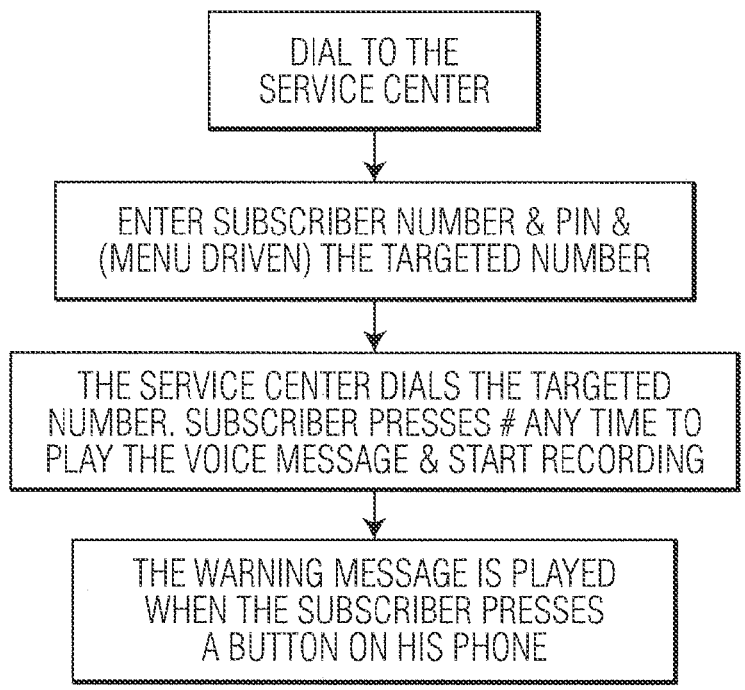

In the preferred embodiment shown in FIG. 2, the first two steps correspond to the steps 1 and 2 according to FIG. 1. Within a third step (step 3) the number to be dialed is subsequently dialed by the service provider system and the subscriber can start the recording manually by pressing a button on his phone, e.g., the * or # button, at any time. When the conversation partner picks up the phone, the subscriber can start the warning voice message by pressing another button on his phone (step 4).

Figure 3A:
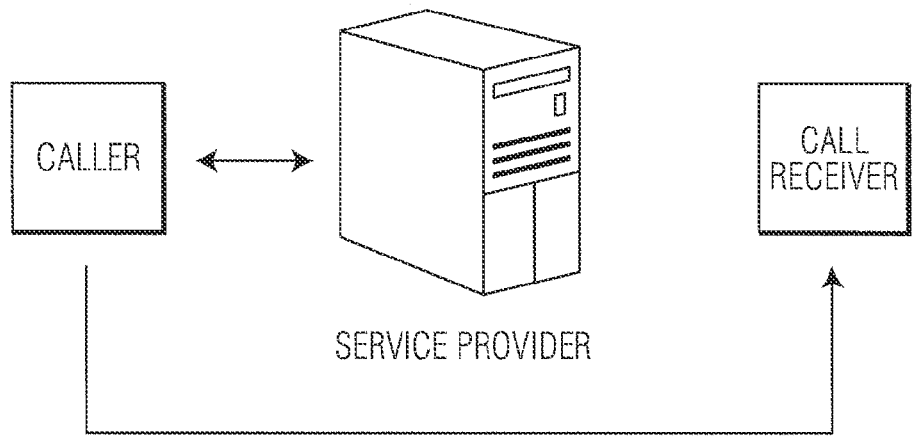
FIG. 3 shows a schematic view of a third variant of the inventive method.
Figure 3B:
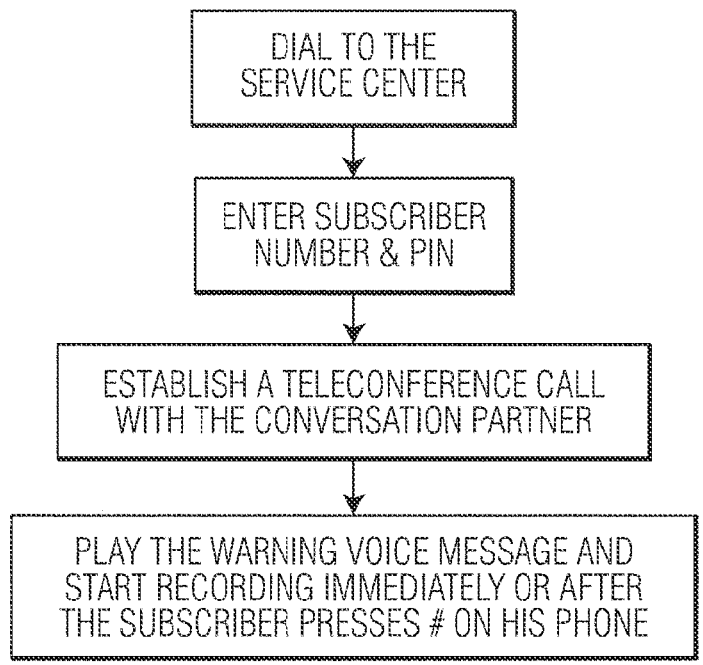

According to another preferred embodiment of the invention shown in FIG. 3, the subscriber can first dial the number of the service provider (step 1) and, after authentication (step 2), establish a teleconference call with the conversation partner (step 3). The playing of the warning voice message and the recording start immediately or after the subscriber presses a button on his phone, e.g., the # button (step 4). Alternatively subscriber can first dial the number of the conversation partner and then establish a teleconference call with the service provider, whereby the playing of the warning voice message and the recording start immediately or after the subscriber presses a button on his phone, e.g., the "#" button.

Figure 4A:
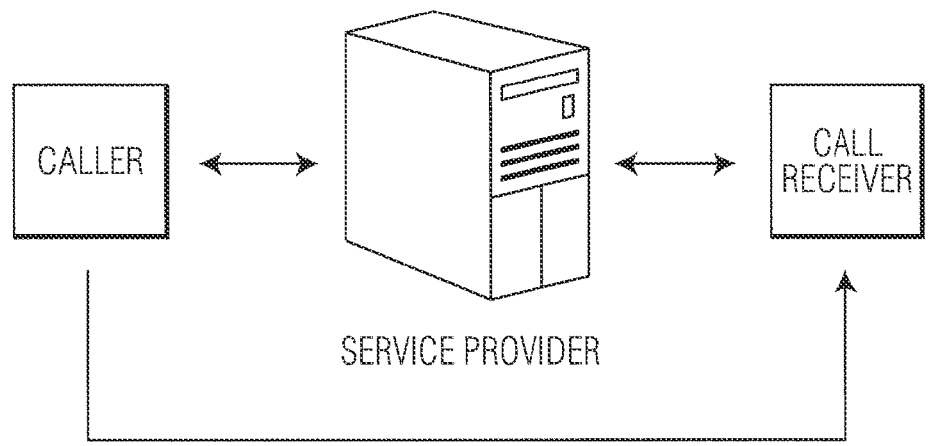
FIG. 4 shows a schematic view of a fourth variant of the inventive method.
Figure 4B:
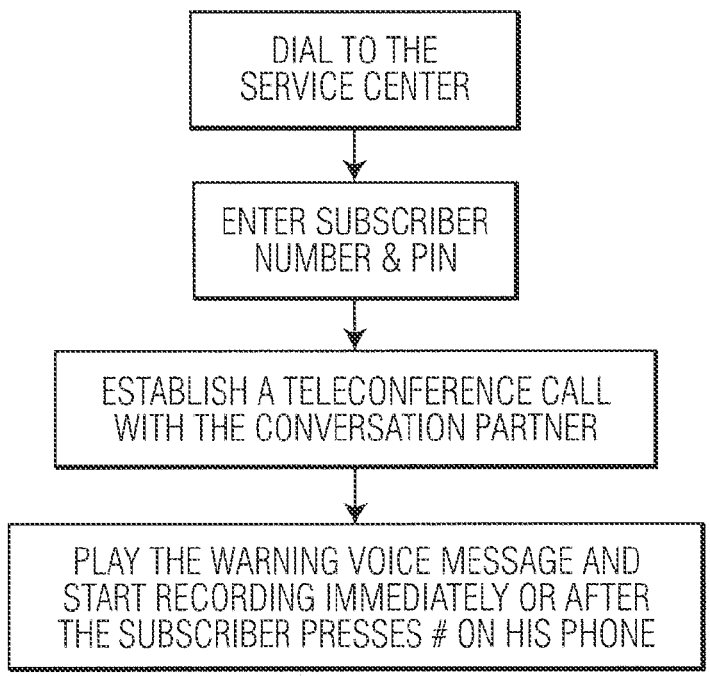

Referring to FIG. 4, in case the subscriber receives a telephone call and the setting that all incoming and outgoing calls are automatically recorded is deactivated, he can dial the number of the service provider (step 1). After the authentication while the caller is in hold (step 2), he can establish a teleconference with the caller and the service provider (step 3) can either play the warning voice message and start recording immediately or start after the subscriber presses a button, e.g. "#", on his phone (step 4).

There has thus been shown and described a novel method for recording telephone conversations which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for recording telephone conversations between a subscriber to a service provider and a telephone conversation partner at a remote location, said method comprising the steps of:
   (a) establish a communication link between the subscriber and the service provider;
   (b) verifying the identity of the subscriber and the validity of the subscriber's subscription with the service provider;
   (c) sending a command from the subscriber to the service provider to select at least one of the following actions by the service provider:
      (1) causing all telephone calls between the subscriber and the subscriber's conversation partners to be recorded;
      (2) deactivating the recording of all telephone calls between the subscriber and the subscriber's conversation partners; and
      (3) recording the next telephone conversation between the subscriber and the subscriber's conversation partner; and
      (1) transmitting at least one previously recorded telephone conversation to the subscribe for listening;
      (2) deleting at least one previously recorded telephone conversation;
      (3) causing all telephone calls between the subscriber and the subscriber's conversation partners to be recorded;
      (4) deactivating the recording of all telephone calls between the subscriber and the subscriber's conversation partners; and
      (5) recording the next telephone conversation between the subscriber and the subscriber's conversation partner;
   (d) sending a warning message from the service provider to the conversation partner which warns that the telephone conversation is being recorded, whenever the service provider is commanded to record the conversation;
   wherein in the case where the subscriber receives a telephone call from a telephone conversation partner and the setting that all incoming and outgoing calls are automatically recorded is deactivated, the subscriber places the conversation partner on hold, dials the number of the service provider and after the verification step sends a command to record the incoming call,
   whereby the conversation partner is subsequently informed by means of the warning message that the conversation will be recorded and the recording starts.

2. The method defined in claim 1, wherein the command causes the service provider to transmit at least one previously recorded telephone conversation to the subscriber for listening.

3. The method defined in claim 1, wherein the command causes the service provider to delete at least one previously recorded telephone conversation.

4. The method defined in claim 1, wherein the command selects action (1) by the service provider.

5. The method defined in claim 1, wherein the command selects action (2) by the service provider.

6. The method defined in claim 1, wherein the command selects action (3) by the service provider.

7. The method defined in claim 1, wherein step (a) includes the step of the subscriber dialing a telephone number of the service provider and step (b) includes the step transmitting authentication codes from the subscriber to the service provider.

8. The method defined in claim 7, wherein the step of transmitting authentication codes include the steps of the subsubscriber interacting with a menu-driven IVR user interface and entering a subscriber number and a corresponding PIN-number to authenticate himself.

9. The method defined in claim 1, wherein step (d) includes the step of transmitting a warning message at the beginning of each conversation to be recorded to inform the telephone conversation partner that the telephone conversation will be recorded.

10. The method defined in claim 1, wherein step (d) includes the subscriber pressing at least one button on his telephone and thereby transmitting a signal to the service provider.

11. The method defined in claim 1, wherein, to record the next telephone conversation, the subscriber transmits a corresponding IVR instruction followed by the telephone number to be dialed, and wherein the number to be dialed is subsequently dialed by the service provider, whereby the recording is caused to start and the warning message is played automatically when the conversation partner answers the telephone.

12. The method defined in claim 1, wherein, to record the next telephone conversation, the subscriber starts the recording manually by pressing a button on his telephone and wherein, when the conversation partner answers the telephone, the subscriber starts the warning message by pressing another button on his telephone.

13. The method defined in claim 1, wherein when the service provider is set to automatically record all incoming and outgoing calls and is thereafter deactivated from doing so, and wherein, when the subscriber wants to record the next telephone conversation, the subscriber first establishes communication with the service provider and, after authentication establishes a teleconference call with the conversation partner, and thereafter presses a button on his telephone command the service provider to issue the warning message and to start recording.

14. The method defined in claim 1, wherein, in the case where the setting that all incoming and outgoing calls are a automatically recorded is deactivated and the subscriber wants to record the next telephone conversation, the subscriber first dials the number of the conversation partner and then establishes a teleconference call with the service provider and authenticates himself to the service provider, whereby the playing of the warning message and the recording start immediately or after the subscriber presses button on his telephone.

15. The method for recording telephone conversations of claim 1, wherein, in the case where the service provider is the telecommunication provider of the subscriber, the recording including the playing of the warning message are initiated without the need for initially establishing a communication link.

16. The method for recording telephone conversations of claim 1, wherein in the case where the automatic recording of all incoming and outgoing calls has been deactivated, the recording starts and the warning message is played in the case of an incoming call after the caller has dialed the subscriber's number and the subscriber answers the telephone, after a communication link with the service provider has been established by the subscriber and the subscriber has transmitted a command to the service provider.

17. The method for recording telephone conversations of claim 1, wherein, in the case of an outgoing call, a communication link with the service provider is first established and the playing of the warning message and the recording start as soon as the conversation partner answers the telephone.

18. The method for recording telephone conversations of claim 1, wherein the settings for manual and automatic initiated recording all incoming and outgoing calls are entered via the Internet after verification by scans of a user subscriber number and a corresponding PIN.

19. The method for recording telephone conversations of claim 1, wherein the recorded telephone conversations are stored on the computer system of the service provider and wherein a subscriber has access to the recordings of his own telephone conversations, either with him as a caller or as a call receiver, for retrieval or deletion.

20. The method for recording telephone conversations of claim 1, wherein each recorded telephone conversation is assigned a unique number which is stated in the warning message transmitted to the telephone conversation part.

21. The method for recording telephone conversations of claim 1, wherein the service provider automatically sends a message containing the voice file of the recorded telephone conversation to an email address or telephone number of the subscriber.

22. The method for recording telephone conversations of claim 1, wherein the telephone conversation partner of a subscriber enters an email address to which the recorded conversation is to be sent after the end of the call.

23. The method for recording telephone conversations of claim 22, wherein the email address of the telephone conversation partner is entered, after playing the warning message informing that the call will be recorded, by the conversation partner pressing a telephone button and subsequently entering the desired email address via IVR interaction.

24. The method for recording telephone conversations of claim 1, wherein the subscriber's telephone conversation partner receives a temporary password as well as the unique number of the conversation at the beginning of the conversation in order to access the recorded conversation online.

25. The method for recording telephone conversations of claim 1, in the subscriber's own recorded, personalized, warning message is used to inform the telephone conversation partner that the call will be recorded.

26. The method for recording telephone conversations of claim 25, wherein the subscriber initially records the warning message and uploads it to the computer system of the service provider.

27. The method for recording telephone conversations of claim 1, wherein the subscriber records at least one of telephone numbers, addresses, and dictations after the end of a telephone call, upon activating this option by pressing a button on the telephone before terminating the call.

28. The method for recording telephone conversations of claim 1, wherein, when the conversation partner of the subscriber fails to affirmatively consent to recording the telephone conversation, by at least one of pressing a telephone instrument button and by interacting with the IVR-System, at least one of the recording and the telephone conversation are interrupted and the conversation partner is informed accordingly.

* * * * *